US012745166B2

(12) United States Patent
Yang et al.

(10) Patent No.: US 12,745,166 B2
(45) Date of Patent: Sep. 22, 2026

(54) NETWORK SELECTION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Haorui Yang, Dongguan (CN); Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 409 days.

(21) Appl. No.: 18/354,056

(22) Filed: Jul. 18, 2023

(65) Prior Publication Data

US 2023/0362804 A1 Nov. 9, 2023

Related U.S. Application Data

(63) Continuation of application No. PCT/CN2021/082415, filed on Mar. 23, 2021.

(51) Int. Cl.

*H04W 48/18* (2009.01)
*H04W 48/16* (2009.01)
*H04W 72/542* (2023.01)
*H04W 84/04* (2009.01)

(52) U.S. Cl.

CPC ........... *H04W 48/18* (2013.01); *H04W 48/16* (2013.01); *H04W 72/542* (2023.01); *H04W 84/042* (2013.01)

(58) Field of Classification Search

CPC ... H04W 48/18; H04W 84/042; H04W 48/16; H04W 72/542

See application file for complete search history.

(56) References Cited

U.S. PATENT DOCUMENTS

2010/0279637 A1 11/2010 Umatt
2019/0261264 A1* 8/2019 Lou ........................ H04W 48/18
2020/0084741 A1 3/2020 Chun et al.

FOREIGN PATENT DOCUMENTS

CN 106131931 A 11/2006
CN 102118839 A 7/2011
CN 106550431 A 3/2017

(Continued)

OTHER PUBLICATIONS

Kurt Bischinger: Deutsche TELEKOM: S1-210038r1, 3GPP Draft; S1-210038R1, 3rd Generation Partnership Project (3GPP), Mobile Competence Centre ; Mar. 2021 (Mar. 15, 2021), XP051986671, Retrieved from the Internet: URL: https://ftp.3gpp.org/tsg_sa/WG1_Serv/TSGS1_93e_Electronic_Meeting/Docs_revised_number/S1-210038r1, Mar. 2021 (Mar. 15, 2021).

(Continued)

*Primary Examiner* — Diane D Mizrahi
(74) *Attorney, Agent, or Firm* — Ladas & Parry LLP

(57) ABSTRACT

A network selection method, a terminal device, and a network device are provided. The network selection method includes acquiring, by a terminal device, first parameters of each of at least two public land mobile networks (PLMNs), the first parameters comprising signal quality and priority; and selecting, by the terminal device, a first PLMN from the at least two PLMNs according to the first parameters of each of the at least two PLMNs.

13 Claims, 7 Drawing Sheets

(56) References Cited

FOREIGN PATENT DOCUMENTS

| | | | |
|---|---|---|---|
| CN | 110546997 | A | 12/2019 |
| EP | 3852485 | A1 | 7/2021 |
| WO | 2015196465 | A1 | 12/2015 |
| WO | 2020055137 | A1 | 3/2020 |

OTHER PUBLICATIONS

European Search Report, European Patent Application No. 21932077.7, mailed Jan. 30, 2024 (9 pages).

3GPP TS 23.122 V17.1.1 (Jan. 2021) , 3rd Generation Partnership Project; Technical Specification Group Core Network and Terminals;Non-Access-Stratum (NAS) functions related to Mobile Station (MS) in idle mode , (Release 17).

3GPP TS 31.102 V16.5.0 (Sep. 2020) , 3rd Generation Partnership Project;Technical Specification Group Core Network and Terminals;Characteristics of the Universal Subscriber Identity Module (USIM) application , (Release 16).

International Search Report,International Application No. PCT/CN2021/082415, mailed Dec. 28, 2021 (15 pages).

* cited by examiner

NETWORK SELECTION METHOD, TERMINAL DEVICE, AND NETWORK DEVICE

CROSS REFERENCE TO RELATED APPLICATIONS

The present disclosure is a continuation of International (PCT) Patent Application No. PCT/CN2021/082415 filed on Mar. 23, 2021, the contents of which is herein incorporated by reference in its entirety.

TECHNICAL FIELD

The present disclosure relates to the field of communication technologies, in particular to a network selection method a terminal device, and a network device.

BACKGROUND

Radio communication technologies (RATs) have entered people's live, a terminal device of a user needs to perform a public land mobile network (PLMN) selection when the terminal device is just turned on or in an idle state, and uses services provided by a PLMN after being accessed to the selected PLMN.

In the related art, when a terminal device performs the PLMN selection, an access stratum (AS) of the terminal device reads system information of surrounding cells, acquires PLMN IDs of the surrounding cells from the system information, and then reports these PLMN IDs to a non-access stratum (NAS), so that the NAS may select a final PLMN according to priority of these PLMNs.

However, since the terminal device only selects a final access network based on the priority of these PLMNs. When a quality of the accessed network is poor, there may be problems such as network instability and repeated disconnection of the user, resulting in poor user experience.

SUMMARY

In a first aspect, a network selection method is provided and includes: acquiring, by a terminal device, first parameters of each of at least two public land mobile networks (PLMNs), the first parameters including signal quality and priority; and selecting, by the terminal device, a first PLMN from the at least two PLMNs according to the first parameters of each of the at least two PLMNs.

In a second aspect, a terminal device is provided and includes a processor, a memory, a receiver, and an interface. The memory is configured to store computer execution instructions. The processor executes the computer execution instructions stored in the memory to perform a method, and the method includes: acquiring, by a terminal device, first parameters of each of at least two public land mobile networks (PLMNs), the first parameters including signal quality and priority; and selecting, by the terminal device, a first PLMN from the at least two PLMNs according to the first parameters of each of the at least two PLMNs.

In a third aspect, a network device is provided and includes a processor, a memory, a transmitter, and an interface. The memory is configured to store computer execution instructions. The processor executes the computer execution instructions stored in the memory to perform a method, and the method includes: configuring or updating, by a network device, a signal-quality threshold of each of at least two public land mobile networks (PLMNs) for a terminal device; and transmitting, by the network device, the signal-quality threshold of each of the at least two PLMNs to the terminal device.

DETAILED DESCRIPTION

Figures 1, 2, 3:
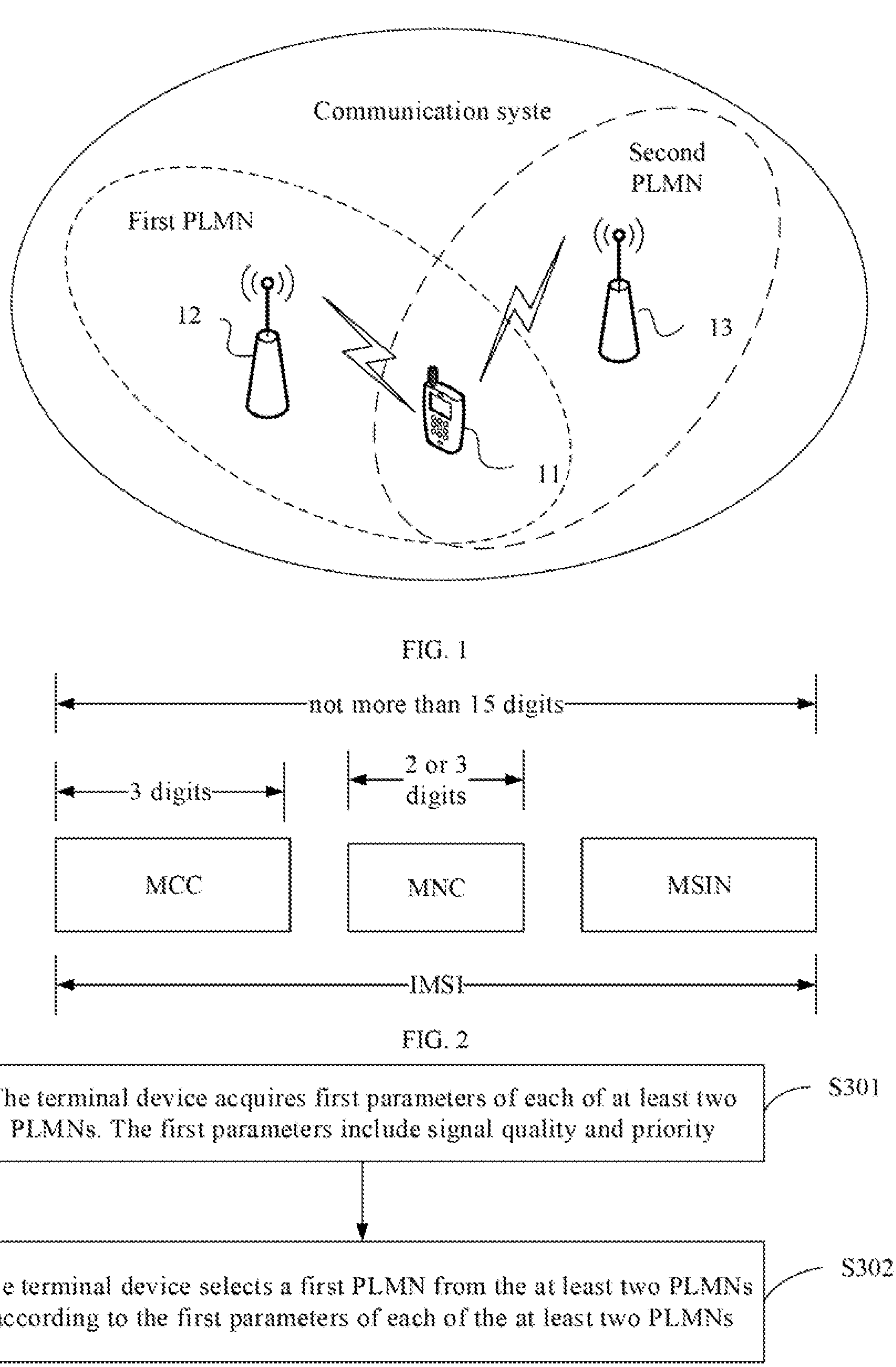
FIG. 1 is a structural schematic diagram of a communication system according to some embodiments of the present disclosure.
FIG. 2 is a structure schematic diagram of an international mobile subscriber identification (IMSI) in a universal subscriber identity module (USIM) card.
FIG. 3 is a schematic flowchart of a first embodiment of a network selection method according to some embodiments of the present disclosure.

In order to make a purpose, technical solutions and technical effect of embodiments of the present disclosure more clear, the technical solution in the embodiments of the present disclosure are described clearly and completely below in combination with the drawings in the embodiments of the present disclosure. It is obvious that the described embodiments are only a part of embodiments of the present disclosure, and not all embodiments. All other embodiments acquired by those skilled in the art based on the embodiments in the present disclosure without the creative work are all within the scope of the present disclosure.

The terms "first", "second", and the like used in the specification and claims of the present disclosure and the above drawings are used to distinguish similar objects, and are not intended to describe a specific order. It should be understood that data used in the manner may be interchanged in appropriate cases, so that the embodiments of the present disclosure described herein may be implemented in a sequence other than those shown or described herein Furthermore, the terms "including" and "having", and any modification thereof are intended to cover un-exclusive inclusion. For example, a process, method, system, product, or device that includes a series of steps or units is not limited to the listed steps or units, but optionally also includes steps or units not listed, or optionally includes other steps or units inherent to these processes, methods, products, or equipment.

Before introducing the technical solutions in embodiments of the present disclosure, terms involved in the embodiments of the present disclosure are explained.

Public Land Mobile Network (PLMN)

The PLMN is a network established and operated by a government or an approved operator for a purpose of providing land mobile communication services to the public. The network is usually interconnected with a public switched telephone network (PSTN) to form a communication network of a whole region or a country.

In practical applications, in order to make the user know a PLMN where he/she is located, each PLMN should have a clear identifier (number), and each PLMN is served as system information and is broadcast by a base station, so that a terminal device under the base station may receive a PLMN.

At present, a PLMN usually consists of a mobile country code (MCC) and a mobile network code (MNC), that is, PLMN=MCC+MNC. Since each mobile communication operator's network may be regarded as a PLMN, the networks of different operators are different PLMNs. With rise of virtual operators, each virtual operator may also be regarded as a PLMN.

For a particular terminal device, it is usually necessary to maintain and/or save several different types of PLMN tables, and each PLMN table may include a plurality of PLMNs. For example, the plurality of PLMNs in each PLMN table may include following.

A registered PLMN (RPLMN): a PLMN registered by a terminal device before last shutdown or disconnection.

An equivalent PLMN (EPLMN): a PLMN in a same position and with a same priority as a PLMN currently selected by a terminal device.

An equivalent home PLMN (EHPLMN): a home PLMN in a same position as a PLMN currently selected by a terminal device.

A home PLMN (HPLMN): a PLMN owned by a terminal user. a MCC and a MNC of an international mobile subscriber identity (IMSI) number on a universal subscriber identity module (USIM) card in the terminal device are same as that of the HPLMN.

A visited PLMN (VPLMN): a PLMN accessed by a terminal user. A MCC and a MNC of The PLMN is not exactly same as a MCC and a MNC of IMSI on the USIM card in A terminal device.

A user controlled PLMN (UPLMN): a parameter stored in a USIM card related to a PLMN selection.

An operator controlled PLMN (OPLMN): a parameter stored in a USIM card related to a PLMN selection.

A forbidden PLMN (FPLMN): a PLMN forbidden to be accessed. A terminal device will add a PLMN to the PLMNs table after the terminal device is rejected to accessed to the PLMN.

An approve PLMN (APLMN): a PLMN where a terminal may find at least one cell and read a PLMN identifier information.

It may be understood that different types of PLMNs have different priority. When the terminal device performs PLMN selection, the terminal device may select PLMNs in following sequence: the RPLMN, the EPLMN, the HPLMN, the EHPLMN, the UPLMN, the OPLMN, and other PLMNs.

Before introducing background technologies and technical solutions of embodiments of the present disclosure, a communication system applicable to embodiments of the present disclosure is described.

For example, FIG. 1 is a structural schematic diagram of a communication system according to some embodiments of the present disclosure. As shown in FIG. 1, the communication system may include at least one terminal device and at least two network devices. FIG. 1 shows one terminal device 11 and two network devices (a first network device 12 and a second network device 13). That is, the terminal device 11 being located within coverage of the two network devices is taken as an example to illustrate.

In the communication system of the embodiment shown in FIG. 1, in some embodiments, the first network device 12 is a network device in a first PLMN, and the second network device 13 is a network device in a second PLMN. The first network device 12 being included in coverage of the first PLMN and the second network device 13 being included in coverage of the second PLMN is taken an example to illustrate. The number of devices covered by the first PLMN and the second PLMN is not limited here.

For example, the terminal device 11 is located within the coverage of the first PLMN and the second PLMN. When the terminal device 11 is powered on or restarted or enters an idle state, it is necessary to reselect a PLMN. For example, a final selected PLMN may be determined from the first PLMN and the second PLMN according to priority and signal quality of the first PLMN, and priority and signal quality of the second PLMN.

In some embodiments of the present disclosure, a network where each network device is located may include: a non 3GPP interworking function (N3IWF), an access and mobility management function (AMF), a session management function (SMF), a user plane function (UPF) and other functional network elements. Presented form of the first network device and the second network device in embodiments of the present disclosure may be any network element of the network in which they are located. The AMF is mainly configured for access and mobile management functions, and the UPF is mainly configured to receive control signaling, process user plane data, and implement other functions.

For example, a network where each network device is located is not limited to the N3iwf, the AMF, the SMF, or the UPF, but may also include an authentication server function (AUSF), a unified data management (UDM), an authentication credential repository and processing function (ARPF), and other network elements, which is not limited to the embodiments of the present disclosure. The AUSF is mainly configured to perform operations related to certification, the UDM is configured to perform user data management and other functions, and the ARPF is mainly configured to store and process a user's identity, key and signing data and other functions.

In some embodiments, the communication system may also include more network devices, and the coverage of each of the network devices may include other terminal devices. Embodiments of the present disclosure does not limit the number of network devices and terminal devices included in the communication system.

As shown in FIG. 1, the terminal device 11 is connected to the first network device 12 or the second network device 13 in a radio manner. For example, an unauthorized spectrum may be used for radio communication between the terminal device 11 and a plurality of network devices. In some embodiments, when the communication system includes a plurality of terminal devices, the terminal devices may perform device to device (D2D) communication.

It may be understood that FIG. 1 is only a schematic diagram of the communication system. The communication system may also include other network devices, such as core network devices, wireless relay devices, and wireless return devices, or may include network controllers, mobile management entities and other network entities. Embodiments of the present disclosure is not limited.

The technical solutions of embodiments of the present disclosure may be applied to various communication systems, such as: a global system of mobile communication (GSM) system, a code division multiple Access (CDMA) system, a broadband code division multiple access (WCDMA) system, a general packet radio service (GPRS), a long term evolution (LTE) system, a LTE frequency division duplex (FDD) system, a LTE time division duplex (TDD) system, an advanced long term evolution (LTE-A) system, a new radio (NR) system, an evolution system of NR system, a LTE based access to unlicensed spectrum (LTE-U) system, a NR based access to unlicensed spectrum (NR-U) system, a worldwide interoperability for microwave access (WiMAX) communication system, a universal mobile communication system (UMTS), a wireless local area networks (WLAN), a wireless fidelity (WiFi), a next-generation communication system or other communication systems.

Generally speaking, traditional communication systems support a limited number of connections and are easy to be implemented. However, with the development of communication technology, mobile communication systems will not only support traditional communication, but also support, for example, device to device (D2D) communication, machine to machine (M2M) communication, machine type communication (MTC), and Vehicle to Vehicle (V2V) communication, etc., embodiments of the present disclosure may also be applied to these communication systems.

The system architecture and service scene described in embodiments of the present disclosure are intended to more clearly describe the technical solutions of the embodiments of the present disclosure, and do not constitute limitation of the technical solutions provided by the embodiments of the present disclosure. Those skilled in the art know should understand that, with evolution of the network architecture and emergence of new service scene, the technical solutions provided by the embodiments of the present disclosure is also applicable to similar technical problems.

The network device involved in embodiments of the present disclosure may be a common base station (such as NodeB or eNB or gNB), a new radio controller (NR controller), a centralized unit, a new radio base station, a radio remote unit, a micro base station, a relay, a distributed unit, a transmission reception point (TRP), a transmission point (TP), or any other device. Embodiments of the present disclosure does not limit the specific technology and specific device form used by the network device. For the convenience of description, in all embodiments of the present disclosure, apparatuses providing radio communication functions for terminal devices are collectively referred to as network devices.

In embodiments of the present disclosure, the terminal device may be any terminal, for example, the terminal device may be a user equipment (UE) for machine class communication. That is to say, the terminal device may also be called a UE, a mobile station (MS), a mobile terminal, or a terminal, etc. The terminal device may communicate with one or more core networks through a radio access network (RAN). For example, the terminal device may be a mobile phone (or called a "cellular" phone), or a computer with a mobile terminal, etc. For example, the terminal device may also be a portable mobile apparatus, a pocket mobile apparatus, a handheld mobile apparatus, a computer built-in mobile apparatus, or a vehicle mounted mobile apparatus that exchanges language and/or data with the wireless access network. There is no specific limitation in the terminal device in embodiments of the present disclosure.

In some embodiments, the network device and the terminal device may be deployed on land including indoor or outdoor, such as a handheld device, a wearable device, or a vehicle device. The terminal device may also be deployed in the water (such as in ships, etc.). The terminal device may also be deployed in the air (such as in aircraft, in balloons, or in satellites, etc.). Embodiments of the present disclosure does not limit application scene of the network device and the terminal device.

In some embodiments, a network device and a terminal device, as well as a terminal device and a terminal device, may communicate through a licensed spectrum, an unlicensed spectrum, or both the licensed spectrum and the unlicensed spectrum. Embodiments of the present disclosure does not limit the spectrum configured for communication between the network device and the terminal device.

A background of the technical solutions in embodiments of the present disclosure is introduced.

At present, under control of the user, the terminal device may work in any of three working modes including a power off state, a standby state, and an online state. The terminal device will disconnect from the wireless network when it is in the power off state. Therefore, a primary task of the terminal device after it is turned on is to search a network and register, that is, a selection network operation. The network selection operation of the terminal device may be divided into two processes including a PLMN selection and a cell search.

During the PLMN selection, a chip in the terminal device may read a HPLMN selector with access technology, a UPLMN selector with access technology, FPLMNs, an EHPLMN, an OPLMN selector with access technology, and other files. In addition, a NAS of the chip in the terminal device may trigger a AS to read system information of surrounding cells and acquire PLMN IDs of the surrounding cells from the system information, the AS reports these PLMN IDs to the NAS, and the NAS selects a final PLMN from these PLMN IDs.

In addition, the AS also reports signal quality of a PLMN that is lower than a quality threshold (for example, −110 dB) to the NAS. That is, the AS reports a PLMN ID and signal quality.

In general, when the terminal device is powered on, the terminal device selects a PLMN network and then selects a cell. However, since the terminal device does not know which PLMN the SIM card or USIM card belong when the terminal device is powered on, the terminal device scans all frequency points after it is powered on, and select a frequency point with a best signal. Regardless of an operator of the frequency point, the terminal device monitors a frequency correction channel (FCCH) and a synchronization channel (SCH) of the frequency point, and then monitors a broadcast control channel (BCCH). The BCCH includes a base station identity code (BSIC), a network color code (NCC) in the BSIC may distinguish which operator owns the frequency point. If the operator is not suitable, the terminal device selects a frequency point with a second strong signal to continue the above operations.

For example, the NAS in the terminal device selects a PLMN in following sequence.

1. Either the HPLMN (if the EHPLMN list is not present or is empty) or the highest priority EHPLMN that is available (if the EHPLMN list is present).

In some embodiments, the HPLMN ID may be acquired from the IMSI of the USIM card. For example, FIG. 2 is a structure schematic diagram of an IMSI in a USIM card. The IMSI is a mark to distinguish mobile users. It is stored in the USIM card and may be configured to distinguish the effective information of mobile users. As shown in FIG. 2, the number of digits of the IMSI is not more than 15 digits and is represented by digits from 0 to 9. The IMSI includes a MCC, a MNC and a mobile subscriber identification number (MSIN), the MCC is a country code of the mobile user and consists of 3 digits. The MNC is a mobile network number, consists of 2 or 3 digits, is configured to identify a mobile communication network to which a mobile user belongs. The MSIN is configured to identify a mobile user in a mobile communication network.

In some embodiments, there is an HPLMN selector with access technology in the USIM card. For example, Table 1 shows a structure of the HPLMN selector with access technology. As shown in Table 1, an identifier of the HPLMN selector with access technology is 6F62, the structure is transparent, an existing state is optional, a short elementary file identifier (SFI) is 13, a file size is 5n bytes, n≥1, and an update activity is low.

In some embodiments, in Table 1, when access conditions are met, access operations for an elementary file (EF) includes READ, UPDATE, DEACTIVATE, and ACTIVATE. The READ requires checking whether a personal identification number (PIN) is correct. The UPDATE, the DEACTIVATE, and the ACTIVATE require authorization, that is, the UPDATE, the DEACTIVATE, and the ACTIVATE meet an access condition to the EF which is under the control of the authority which creates this file (ADM).

For example, as shown in Table 1, description of each byte in the HPLMN selector with access technology is as follows. Bytes 1 to 3 are configured to describe a first PLMN, which are mandatory (M) in the file, and length of the bytes 1 to 3 is 3 bytes. Bytes 4 to 5 are configured to describe an identifier of a first PLMN access technology, which are mandatory (M) in the file, and length of bytes 4 to 5 is 2 bytes. Bytes 6 to 8 are configured to describe a second PLMN, which are optional (O) in the file, and length of bytes 6 to 8 is 3 bytes. Bytes 9 to 10 are configured to describe an identifier of a second PLMN access technology, which are optional (O) in the file, and length of bytes 9 to 10 is 2 bytes. By analogy, bytes (5n−4) to (5n−2) are configured to describe a nth PLMN, which are optional (O) in the file, and length of bytes (5n−4) to (5n−2) is 3 bytes. Bytes (5n−1) to (5n) are configured to describe an identifier of a nth PLMN access technology, which are optional (O) in the file, and length of bytes (5n−1) to (5n) is 2 bytes.

TABLE 1

| Structure of HPLMN selector with access technology | | | |
|---|---|---|---|
| Identifier: '6F62' | Structure: Transparent | | Optional |
| SFI: '13' | | | |
| File size: 5n (n ≥ 1) bytes | | | Update activity: low |
| Access Conditions: | | | |
| READ | PIN | | |
| UPDATE | ADM | | |
| DEACTIVATE | ADM | | |
| ACTIVATE | ADM | | |
| Bytes | Description | M/O | Length |
| 1 to 3 | 1st PLMN | M | 3 bytes |
| 4 to 5 | 1st PLMN Access Technology Identifier | M | 2 bytes |
| 6 to 8 | 2nd PLMN | O | 3 bytes |
| 9 to 10 | 2nd PLMN Access Technology Identifier | O | 2 bytes |
| . | . | | |
| . | . | | |
| . | . | | |
| (5n-4) to (5n-2) | nth PLMN | O | 3 bytes |
| (5n-1) to 5n | nth PLMN Access Technology Identifier | O | 2 bytes |

According to the analysis in Table 1, the higher the HPLMN ranks in the file, the higher the priority.

For example, a mobile 4G card configured with LTE has a higher priority than a mobile 2G card configured with LTE. The terminal device gives priority to the mobile 4G network when selecting a PLMN. When there is no 4G coverage around, the terminal device will select a mobile 2G network.

In practical application, since the EHPLMN and the HPLMN may provide a same service for a terminal device, their roles are same. Therefore, the priority of a radio access technology (RAT) in Table 1 above may also be applied to the EHPLMN.

2. Each PLMN/access technology combination in the "User Controlled PLMN Selector with Access Technology" data file in the SIM (in priority order)
3. Each PLMN/access technology combination in the "Operator Controlled PLMN Selector with Access Technology" data file in the SIM (in priority order) or stored in the ME (in priority order)

For example, Table 2 shows a structure of an OPLMN selector with access technology. As shown in Table 2, an identifier of the OPLMN selector with access technology is 6F61, the structure is transparent, an existing state is optional, and a SFI is 11, a file size is 5n bytes, n≥8, and an update activity is low.

Similarly, in Table 2, when access conditions are met, access operations for an EF also includes READ, UPDATE, DEACTIVATE, and ACTIVATE. The READ requires checking whether a PIN is correct, the UPDATE, the DEACTIVATE, and the ACTIVATE require authorization (ADM).

For example, as shown in Table 2, description of each byte in the OPLMN selector with access technology is as follows. Bytes 1 to 3 are configured to describe a first PLMN (having the highest priority), which are mandatory (M) in the file, and length of the bytes 1 to 3 is 3 bytes. Bytes 4 to 5 are configured to describe an identifier of a first PLMN access technology, which are mandatory (M) in the file, and length of bytes 4 to 5 is 2 bytes. By analogy, bytes 36 to 38 are configured to describe an eighth PLMN, which are mandatory (M) in the file, and length of bytes 36 to 38 is 3 bytes. Bytes 39 to 40 are configured to describe an identifier of an eighth PLMN access technology, which are mandatory (M) in the file, and length of bytes 39 to 40 is 2 bytes. Bytes 41 to 43 are configured to describe a ninth PLMN, which are optional (O) in the file, and length of bytes 41 to 43 is 3 bytes. Bytes 44 to 45 are configured to describe an identifier of a ninth PLMN access technology, which are optional (O) in the file, and length of bytes 44 to 45 is 2 bytes. By analogy, bytes (5n−4) to (5n−2) are configured to describe a nth PLMN (having the lowest priority), which are optional (O) in the file, and length of bytes (5n−4) to (5n−2) is 3 bytes. Bytes (5n−1) to (5n) are configured to describe an identifier of a nth PLMN access technology, which are optional (O) in the file, and length of bytes (5n−1) to (5n) is 2 bytes.

TABLE 2

Structure of an OPLMN selector with access technology

Identifier: '6F61' Structure: transparent Optional
SFI: '11'
File size: 5n bytes, (n ≥ 8) Update activity: low Access Conditions:

| | |
|---|---|
| READ | PIN |
| UPDATE | ADM |
| DEACTIVATE | ADM |
| ACTIVATE | ADM |

| Bytes | Description | M/O | Length |
|---|---|---|---|
| 1 to 3 | 1st PLMN (highest priority) | M | 3 bytes |
| 4 to 5 | 1st PLMN Access Technology Identifier | M | 2 bytes |
| . | . | | |
| . | . | | |
| . | . | | |
| 36 to 38 | 8th PLMN | M | 3 bytes |
| 39 to 40 | 8th PLMN Access Technology Identifier | M | 2 bytes |
| 41 to 43 | 9th PLMN | O | 3 bytes |
| 44 to 45 | 9th PLMN Access Technology Identifier | O | 2 bytes |
| . | . | | |
| . | . | | |
| . | . | | |
| (5n-4) to (5n-2) | Nth PLMN (lowest priority) | O | 3 bytes |
| (5n-1) to 5n | Nth PLMN Access Technology Identifier | O | 2 bytes |

According to the analysis in Table 2, each of the PLMNs is followed by a RAT. The higher the OPLMN ranks in the file, the higher the priority.

4. Other PLMN/access technology combinations with received high quality signal in random order
5. Other PLMN/access technology combinations in order of decreasing signal quality According to the above analysis, it may be seen that, at present, a terminal device gives priority to priority of a PLMN when selecting a sequence of PLMN. Only when an appropriate PLMN may not be determined through the priority of PLMN, signal quality of PLMN is considered. Therefore, in the related art, the terminal device usually selects a final access PLMN only based on the priority of PLMN. Even if signal quality of the high priority PLMN is poor, the terminal device will select the PLMN. In this case, there may be problems such as network instability and repeated disconnection of the user, resulting in poor user experience.

In view of the above technical problems, a conceptual process of the technical solution of the present disclosure is as follows. In the related art, since the terminal device usually only considers priority of a PLMN when selecting a PLMN, there may be a problem that the terminal device selects a PLMN with a high priority but a poor signal quality, especially in roaming scene, which may cause frequent disconnection of the terminal device, poor user experience, and even the PLMN operator receiving complaints. Therefore, the PLMN operator has a control requirement for the terminal device accessed to the network. For example, the PLMN operator may control the terminal to be accessed to a PLMN when detecting that signal quality of the PLMN is greater than or equal to a signal-quality threshold. For the control requirement, it is found that, before selecting a PLMN, the terminal device refers to signal quality of a PLMN and priority of the PLMN at a same time, and removes a PLMN with a poor quality, which may ensure that the selected PLMN is a PLMN with higher priority and meets the signal quality requirements, thereby effectively avoiding the problem of repeated disconnection of terminal device and improving the user experience.

Based on the above technical conception process, a network selection method is provided in embodiments of the present disclosure. The terminal device acquires first parameters of each of at least two PLMNs, the first parameter includes signal quality and priority. The terminal device selects a first PLMN from the at least two PLMNs according to the first parameters of each of at least two PLMNs. In the technical solution, the terminal device selects a PLMN based on the priority of the PLMNs and the signal quality of the PLMNs, so that the signal quality of the selected first PLMN meets a requirement and has a relatively high priority, which effectively avoids the problems of a network accessed by a user being unstable and the repeated disconnection of the user, thereby improving the user experience.

Based on the above technical solution and technical conception process, the technical solution of the present disclosure is described in detail below through specific embodiments. It should be noted that the technical solution of the present disclosure may include some or all of following contents, and the following specific embodiments may be combined with each other. Same or similar concepts or processes may not be repeated in some embodiments.

FIG. 3 is a schematic flowchart of a first embodiment of a network selection method according to some embodiments of the present disclosure. As shown in FIG. 3, the network selection method may include following operations.

At operation S301, the terminal device acquires first parameters of each of at least two PLMNs. The first parameters include signal quality and priority.

In embodiments of the present disclosure, the terminal device may execute a PLMN selection when it is turned on, restarted, or enters an idle state. Specifically, the terminal device first searches or detects PLMNs in a scene where it is located. Generally, there are a plurality of PLMNs in a same scene. There being at least two PLMNs in the same scene is taken as an example in embodiments of the present disclosure.

For example, the terminal device determines at least two PLMNs by detecting whether there are signals transmitted by network devices within coverage of PLMNs. Therefore, the terminal device may acquire signal quality of each of the at least two PLMNs while detecting the at least two PLMNs.

In some embodiments, the signal quality of each of the PLMNs is usually the signal quality detected by the terminal device, that is, the terminal device determines the signal quality based on received system information. For example, the signal quality of each of the PLMNs may be a size of the reference signal receiving power (RSRP) received by the terminal device, or a size of the power of other signals, which is not limited.

At operation S302, the terminal device selects a first PLMN from the at least two PLMNs according to the first parameters of each of the at least two PLMNs.

For example, when the first parameters include signal quality and priority. When the terminal device acquires the signal quality of each of the at least two PLMNs, the terminal device may query a list of PLMNs preset in the terminal device, determine priority of each of the PLMNs, and then combine the signal quality of each of the PLMNs based on the known priority of each of the PLMNs, finally select one PLMN from the at least two detected PLMNs. In embodiments of the present disclosure, the final selected PLMN is called the first PLMN. The embodiment of the present disclosure does not limit a specific implementation of the first PLMN.

In some embodiments, in some embodiments of the present application, a profile such as a HPLMN selector with access technology, an OPLMN selector with access technology, or the like in the terminal device may be preset with a pre-written signal-quality threshold for each of PLMNs, and the pre-written signal-quality threshold may be understood as lowest signal quality allowed to be selected by the terminal device.

Therefore, when the terminal device determines that signal quality of a PLMN is lower than a signal-quality threshold of a PLMN, the signal quality may generally be removed and not selected. That is, the first PLMN selected by the terminal device from the above at least two PLMNs may meet following conditions. The signal quality of the first PLMN is greater than or equal to the signal-quality threshold of the first PLMN, and the priority of the first PLMN is higher in the above at least two PLMNs.

In some embodiments of the present disclosure, the terminal device may also sort the above at least two PLMNs according to the signal quality of each of the at least two PLMNs in a sequence of signal quality from high to low, screen out anterior N PLMNs in the sequence, N is an integer greater than or equal to 1, and then the terminal device may determine a PLMN with a highest priority in the N PLMNs as the first PLMN. That is, when the terminal device detects a plurality of PLMNs, the terminal device may select anterior N PLMNs in the sequence with best signal quality according to the signal quality of each of the at least two PLMNs, and then select a PLMN with a highest priority as the first PLMN according to the priority sequence of the at least two PLMNs.

It may be understood that the above two examples of determining the first PLMN are given in embodiments of the present disclosure. In practical applications, other forms may be available. The first PLMN may be selected according to actual scenario or settings, which is not repeated here.

In the network selection method provided by embodiments of the present disclosure, the terminal device acquires first parameters of each of at least two PLMNs, the first parameters include signal quality and priority. The terminal device selects a first PLMN from the at least two PLMNs according to the first parameter of each of at least two PLMNs. In the technical solution, the terminal device selects a PLMN based on the priority of the PLMNs and the signal quality of the PLMNs, so that the signal quality of the selected first PLMN meets a requirement and has a relatively high priority, which effectively avoids the problems of a network accessed by a user being unstable and the repeated disconnection of the user, thereby improving the user experience.

Figure 4:
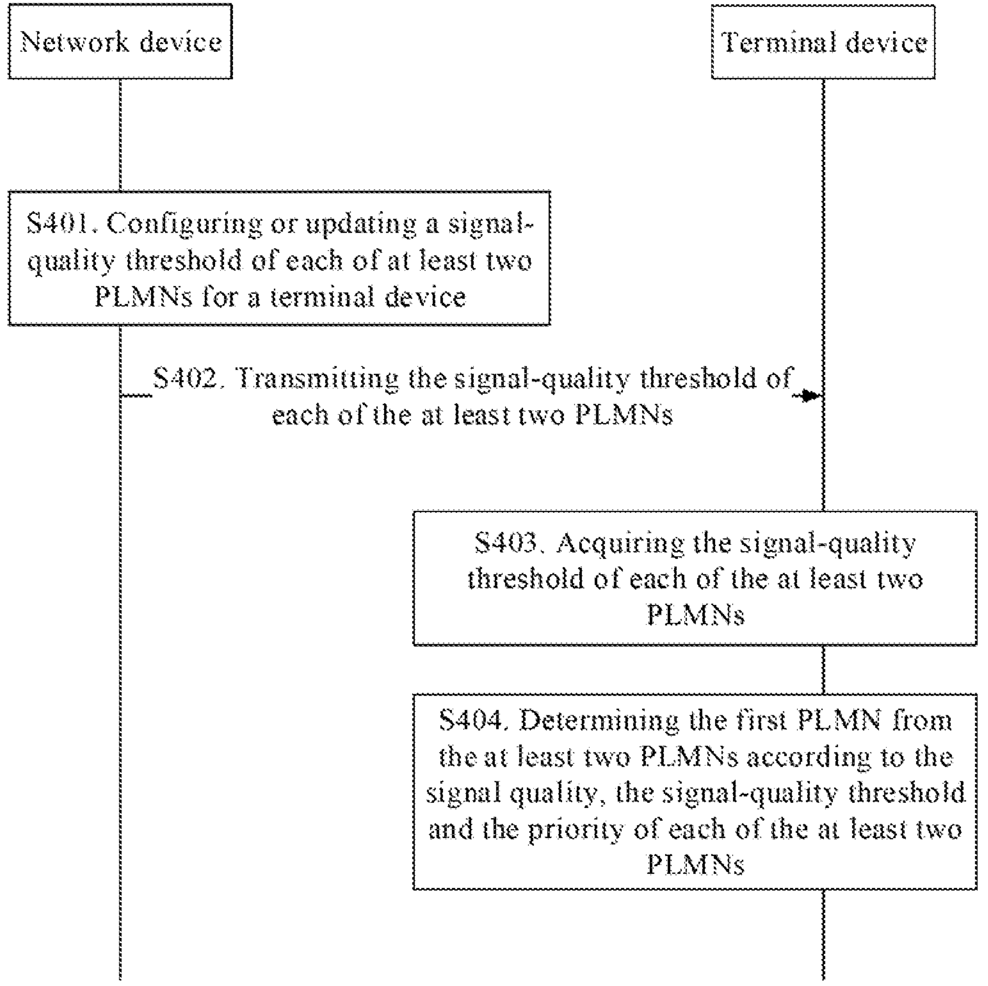
FIG. 4 is an interactive schematic diagram of a second embodiment of a network selection method according to some embodiments of the present disclosure.

For example, on the basis of the above embodiments, FIG. 4 is an interactive schematic diagram of a second embodiment of a network selection method according to some embodiments of the present disclosure. The method is explained by information interaction between a network device and a terminal device. As shown in FIG. 4, in embodiments of the present disclosure, the network selection method may also include following operations.

At operation S401, a network device configures or updates a signal-quality threshold of each of at least two PLMNs for a terminal device.

For example, in practical applications, in order to ensure that the terminal device may effectively avoid a PLMN with poor signal quality when performing a PLMN selection subsequently, the network device may configure or update signal-quality thresholds at least two PLMN for the terminal device in advance, so that the terminal device can may simultaneously consider detected priority and signal quality of each of the at least two PLMNs.

In some embodiments, in practical applications, each network device (for example, a base station) usually belongs to only one PLMN, in some embodiments, a plurality of PLMNs may share a base station. System information includes one or more PLMN IDs that may be accessed by the base station and a threshold corresponding to each of the plurality of PLMNs.

For example, for a specific PLMN such as a HPLMN, when generating a USIM card or a SIM card, the network device in the HPLMN may add or update a signal-quality threshold of each of available PLMNs in a profile of the USIM card or a SIM card by configuring or updating the profile of the USIM card or SIM card. For example, the profile may be an HPLMN selector with access technology, an OPLMN selector with access technology, or other types of files related to PLMN selectors, which are not limited by embodiments of the present disclosure.

For another example, the network device (for example, a UDM) may add a signal-quality threshold of each of PLMNs to parameters in NAS signaling, thereby implementing the purpose of configuring or updating the signal-quality threshold of each of the PLMNs for the terminal device. For example, the parameters in the NAS signaling may be a steering of roaming transparent container parameter, that is, the network device in the related art may update a profile in an USIM card or a SIM card through the steering of roaming transparent container parameter. In embodiments of the present disclosure, the terminal device may also be configured or updated the signal-quality threshold of each of the at least two PLMNs by adding the signal-quality threshold of each of the at least two PLMNs in the steering of roaming transparent container parameter.

For still another example, in a communication process between the network device and the terminal device, the network device (for example, a base station) may also add a signal-quality threshold of the PLMN to which the network device belongs in system information, thereby implementing the purpose of configuring or updating the signal-quality threshold of each of the at least two PLMNs for the terminal device by broadcasting the system information.

It may be understood that embodiments of the present disclosure are not limited to the way that the terminal device are configured the signal-quality threshold of each of the at least two PLMNs, which may be selected according to a practical situation and is not repeated here.

At operation S402, the network device transmits the signal-quality threshold of each of the at least two PLMNs to the terminal device.

In embodiments of the present disclosure, after the network device configures or updates the signal-quality threshold of each of the at least two PLMNs for the terminal device in different ways, it needs to transmit the signal-quality threshold to the terminal device in a corresponding way.

For example, when the signal-quality threshold of each of the at least two PLMNs is configured or updated for the terminal device by adding the signal-quality threshold of each of the at least two PLMNs in the NAS signaling, the network device (such as an UDM) transmits the signal-quality threshold of each of the at least two PLMNs to the terminal device through the NAS signaling.

Accordingly, the terminal device may acquire the signal-quality threshold of each of the at least two PLMNs by analyzing the received NAS signaling. In one possible design, the terminal device may write the signal-quality threshold of each of the at least two PLMNs into the profile in the USIM card or the SIM card, or update the signal-quality threshold of each of the at least two PLMNs in the profile in the USIM card or the SIM card. In another possible design, the terminal device may store the acquired signal-quality threshold of each of the at least two PLMNs into storage space of the terminal device for subsequent use.

For another example, for each of the at least two PLMNs, when the terminal device is configured or updated the signal-quality threshold of each of the at least two PLMNs by adding the signal-quality threshold of each of the at least two PLMNs in the system information of the base station, the network device (such as a base station) broadcasts the signal-quality threshold of each of the at least two PLMNs to the terminal device through the system information. Accordingly, the terminal device may analyze the received sys tem information, and determine the signal-quality threshold corresponding each of the at least two PLMNs.

It may be understood that the network device only transmits the signal-quality threshold of the PLMN to which the network device belongs to the terminal device. The terminal device needs to acquire the signal-quality threshold of each of the at least two PLMNs by analyzing the at least one received system information.

In some embodiments, in embodiments of the present disclosure, the signal-quality threshold includes at least one of following.

A signal-quality threshold corresponding to a PLMN, and a signal-quality threshold corresponding to the RAT applied in a PLMN.

In some embodiments, PLMNs may be networks of different operators. The signal-quality threshold corresponding to the PLMN is a minimum signal quality value of the PLMN that terminal device is allowed to select. The RAT applied in the PLMN may be any of 2G, 3G, 4G or 5G. Therefore, the signal-quality threshold corresponding to the RAT applied in the PLMN is a minimum signal quality value of the RAT applied in of the PLMN that the terminal device is allowed to select.

It may be understood that signal-quality thresholds corresponding to different PLMNs, signal-quality thresholds corresponding to a same RAT applied in different PLMNs, and the signal-quality thresholds corresponding to different RATs applied in the same PLMN may be same or different, which are determined according to a minimum value that may be received by the corresponding operators, and are not repeated here.

Correspondingly, in embodiments of the present disclosure, the first parameters may also include the signal-quality threshold. That is, before operation S302, the network selection method may also include following operations.

At operation S403, the terminal device acquires the signal-quality threshold of each of the at least two PLMNs.

In some embodiments, when the network device configures and transmits the signal-quality threshold each of the at least two PLMNs for the terminal device, the terminal device may acquire the signal-quality threshold each of the at least two PLMNs by an analyzing process for the received information.

For example, the signal-quality threshold is derived from a profile in a global subscriber identity card.

In some embodiments, Table 3 is a structure of the profile in the USIM card in embodiments of the present disclosure. It may be seen from Table 3 that a difference between Table 3 and Table 1 above is that a signal strength of each PLMN, that is, a signal-quality threshold of each PLMN, is also configured behind the corresponding PLMN. For example, a signal strength of a first PLMN, that is, a signal-quality threshold of the first PLMN, is configured behind the first PLMN. A signal strength of a second PLMN, that is, a signal-quality threshold of the second PLMN, is configured behind the second PLMN, etc. Accordingly, a signal strength of the nth PLMN, that is, a signal-quality threshold of the nth PLMN, is configured behind a nth PLMN.

TABLE 3

A structure of the profile in the USIM card in embodiments of the present disclosure Identifier: '6F62' Structure: Transparent Optional
SFI: '13'
File size: 5n (n ≥ 1) bytes Update activity: low Access Conditions:

| | |
|---|---|
| READ | PIN |
| UPDATE | ADM |
| DEACTIVATE | ADM |
| ACTIVATE | ADM |

| Bytes | Description | M/O | Length |
|---|---|---|---|
| 1 to 3 | 1st PLMN | M | 3 bytes |
| | 1st PLMN signal strength | | 2 bytes |
| 4 to 5 | 1st PLMN Access Technology Identifier | M | 2 bytes |
| 6 to 8 | 2$^{nd}$ PLMN | O | 3 bytes |
| | 2nd PLMN signal strength | | 2 bytes |
| 9 to 10 | 2nd PLMN Access Technology Identifier | O | 2 bytes |
| . | . | | |
| . | . | | |
| . | . | | |
| (5n-4) to (5n-2) | nth PLMN | O | 3 bytes |
| | nth PLMN signal strength | | 2 bytes |
| (5n-1) to 5n | nth PLMN Access Technology Identifier | O | 2 bytes |

It may be understood that, in practical applications, each PLMN occupies 3 bytes because of the PLMN ID format, which is a fixed byte length. The newly added signal strength corresponding to each PLMN usually occupies 2 bytes. Considering the need to be compatible with published standards, new fields may be used. Accordingly, a size of the file may also change, and a meaning of each byte may change, which may be determined according to subsequent standards, and is not repeated here.

In some embodiments, Table 4 is another structure of the profile in the USIM card in embodiments of the present disclosure. It may be seen from Table 4 that the difference between Table 4 and Table 1 above is that a signal strength of a RAT identifier applied in each PLMN, that is, a signal-quality threshold of the RAT applied in each PLMN, is also configured behind the RAT identifier applied in the corresponding PLMN. For example, a signal strength of a RAT identifier applied in a first PLMN, that is, a signal-quality threshold of the RAT applied in the first PLMN, is configured behind the RAT identifier applied in the first PLMN. A signal strength of a RAT applied in a second PLMN, that is, a signal-quality threshold of the RAT applied in the second PLMN, is configured behind the RAT applied in the second PLMN, etc. Correspondingly, a signal strength of a RAT identifier applied in a nth PLMN, that is, a signal-quality threshold of the RAT applied in the nth PLMN, is configured behind the RAT identifier applied in the nth PLMN.

TABLE 4

Another structure of the profile in the USIM card in embodiments of the present disclosure

| | | | |
|---|---|---|---|
| Identifier: '6F62' SFI: '13' | Structure: Transparent | | Optional |
| File size: 5n (n ≥ 1) bytes | | Update activity: low | |
| | Access Conditions: | | |
| | READ | PIN | |
| | UPDATE | ADM | |
| | DEACTIVATE | ADM | |
| | ACTIVATE | ADM | |
| **Bytes** | **Description** | **M/O** | **Length** |
| 1 to 3 | 1st PLMN | M | 3 bytes |
| 4 to 5 | 1st PLMN Access Technology Identifier | M | 2 bytes |
| | 1st PLMN Access Technology Identifier signal strength | | 2 bytes |
| 6 to 8 | 2nd PLMN | O | 3 bytes |
| 9 to 10 | 2nd PLMN Access Technology Identifier | O | 2 bytes |
| | 2nd PLMN Access Technology Identifier signal strength | | 2 bytes |
| . . . | . . . | | |
| (5n-4) to (5n-2) | nth PLMN | O | 3 bytes |
| (5n-1) to 5n | nth PLMN Access Technology Identifier | O | 2 bytes |
| | nth PLMN signal strength signal strength | | 2 bytes |

It may be understood that, in practical applications, since a length of bytes occupied by the RAT identifier applied in each PLMN is not fixed, a signal strength and an identifier of the RAT applied in each PLMN may be combined to occupy a length of 2 bytes. However, in order to be compatible with published standards, new fields may be used. Accordingly, a size of the file may also change. In addition, a meaning of each byte may change, which may be determined according to subsequent standards, and is not repeated here.

In some embodiments, Table 5 is still another structure of the profile in the USIM card in embodiments of the present disclosure. It may be seen from Table 5 that the difference between Table 5 and Table 1 above is that a signal strength of each PLMN (that is, a signal-quality threshold of each PLMN) is configured behind the corresponding PLMN. In addition, a signal strength of a RAT identifier applied in each PLMN (that is, a signal-quality threshold of a RAT applied in each PLMN) is also configured behind the RAT identifier applied in the corresponding PLMN. For example, a signal strength of a first PLMN is configured behind the first PLMN, and a signal strength of a RAT identifier applied in the first PLMN is configured behind the RAT identifier applied in the first PLMN. By analogy, a signal strength of a nth PLMN is configured behind the nth PLMN, and a signal strength of a RAT identifier applied in the nth PLMN is configured behind the RAT identifier applied in the nth PLMN.

TABLE 5

Still another structure of the profile in the USIM card in embodiments of the present disclosure

| | | | |
|---|---|---|---|
| Identifier: '6F62' SFI: '13' | Structure: Transparent | | Optional |
| File size: 5n (n ≥ 1) bytes | | Update activity: low | |
| | Access Conditions: | | |
| | READ | PIN | |
| | UPDATE | ADM | |
| | DEACTIVATE | ADM | |
| | ACTIVATE | ADM | |
| **Bytes** | **Description** | **M/O** | **Length** |
| 1 to 3 | 1st PLMN | M | 3 bytes |
| | 1st PLMN signal strength | | 2 bytes |
| 4 to 5 | 1st PLMN Access Technology Identifier | M | 2 bytes |
| | 1st PLMN Access Technology Identifier signal strength | | 2 bytes |
| 6 to 8 | 2nd PLMN | O | 3 bytes |
| | 2nd PLMN signal strength | | 2 bytes |
| 9 to 10 | 2nd PLMN Access Technology Identifier | O | 2 bytes |
| | 2nd PLMN Access Technology Identifier signal strength | | 2 bytes |
| . . . | . . . | | |
| (5n-4) to (5n-2) | nth PLMN | O | 3 bytes |
| | nth PLMN signal strength | | 2 bytes |
| (5n-1) to 5n | nth PLMN Access Technology Identifier | O | 2 bytes |
| | nth PLMN Access Technology Identifier signal strength | | 2 bytes |

Configuration modes of the signal strength of each PLMN and the signal strength of the RAT applied in each PLMN in Table 5 are similar to those recorded in Table 3 and Table 4 above, and are not repeated here.

In embodiments of the present disclosure, since there may be a plurality of RATs corresponding to each PLMN, in one possible design, an identifier of the first PLMN may be the same as that of the second PLMN and the RAT applied in the first PLMN may be different from that applied in the second PLMN. In another possible design, the identifier of the first PLMN may be different from that of the second PLMN, and the RAT applied in the first PLMN may be the same as that applied in the second PLMN, which is not limited.

It may be understood that, in embodiments of the present disclosure, the profile being the HPLMN selector with access technology is taken as an example. In practical applications, the profile may also be an OPLMN selector with access technology or other PLMN selector file. The manner to configure the signal strength threshold of PLMN in the file or the signal strength threshold of the RAT applied in PLMN is similar to the manner mentioned above, and is not repeated here.

According to the above records, in practical applications, the terminal device may include an AS and a NAS. Therefore, the NAS of the terminal device may acquire the signal-quality threshold of each PLMN by reading the profile in the USIM card.

In some embodiments, the AS of the terminal device may include a physical (PHY) stratum, a media access control (MAC) stratum, a radio link control (RLC) stratum, a packet data convergence protocol (PDCP) stratum, and a radio resource control (RRC) stratum from bottom to top. The NAS of the terminal device may include a NAS mobile management (NAS-MM) stratum and a NAS session management (NAS-SM) stratum. The NAS-SM is configured to support a session management function between the terminal device and the SMF, and the NAS-MM is configured to support a mobility management function between the terminal device and the AMF.

Further, in some embodiments, the NAS of the terminal device may transmit the identifier and the signal-quality threshold of each of the at least two PLMNs to the AS of the terminal device, so that the AS may perform the selection of PLMN.

For another example, the signal-quality threshold of each PLMN may also be derived from the storage space of the terminal device. That is, when the terminal device detects at least two PLMNs and the signal quality of each of the at least two PLMNs during the PLMN selection process, the terminal device may acquire the signal-quality threshold of each of the at least two PLMNs from the internal storage space.

In some embodiments, when the network device transmits the signal-quality threshold of each PLMN to the terminal device through the NAS signaling, correspondingly, the NAS of the terminal device may acquire the signal-quality threshold of each PLMN through the NAS signaling.

For still another example, the signal-quality threshold of each PLMN is derived from system information of the network device. In some embodiments, when the network device configures and transmits a signal-quality threshold of a PLMN where the network device is located in the system information, the AS of the terminal device may acquire the signal-quality threshold of the PLMN where the network device is located when it reads the received system information.

Accordingly, in some embodiments, operation S302 may be replaced by following operations.

At operation S404, the terminal device determines the first PLMN from the at least two PLMNs according to the signal quality, the signal-quality threshold and the priority of each of the at least two PLMNs.

In embodiments of the present disclosure, after acquiring the signal quality and signal-quality threshold of each of the at least two PLMNs, the terminal device may select the acquired one of the at least two PLMNs as the first PLMN in combination with the priority of each of the at least two PLMNs.

In the network selection method provided by embodiments of the present disclosure, the network device configures or updates the signal-quality threshold of each of the at least two PLMNs for the terminal device, and transmits the signal-quality threshold to the terminal device. Accordingly, after the terminal device acquires the signal-quality threshold of each of the at least two PLMNs, according to the signal quality, the signal-quality threshold and the priority of each of the at least two PLMNs, the terminal device determines the first PLMN from the at least two PLMNs. In this technical solution, the terminal device may determine the first PLMN that may meet the signal quality requirements and has high priority according to the signal-quality threshold of the at least two PLMNs configured or updated by the network device and combined with the signal quality and priority of each of the detected at least two PLMNs, so that the terminal device has high stability after being accessed to the first PLMN.

In practical application, since both the AS and the NAS included in the terminal device may participate in the PLMN selection process, following explains specific implementation of operation S404 with information interaction between the AS and the NAS in the terminal device in the embodiments shown in FIGS. 5 to 8. Implementation principles not detailed in the embodiments shown in FIGS. 5 to 8 may refer to the records in the embodiments shown in FIGS. 3 and 4 above, which are not repeated here.

Figure 5:
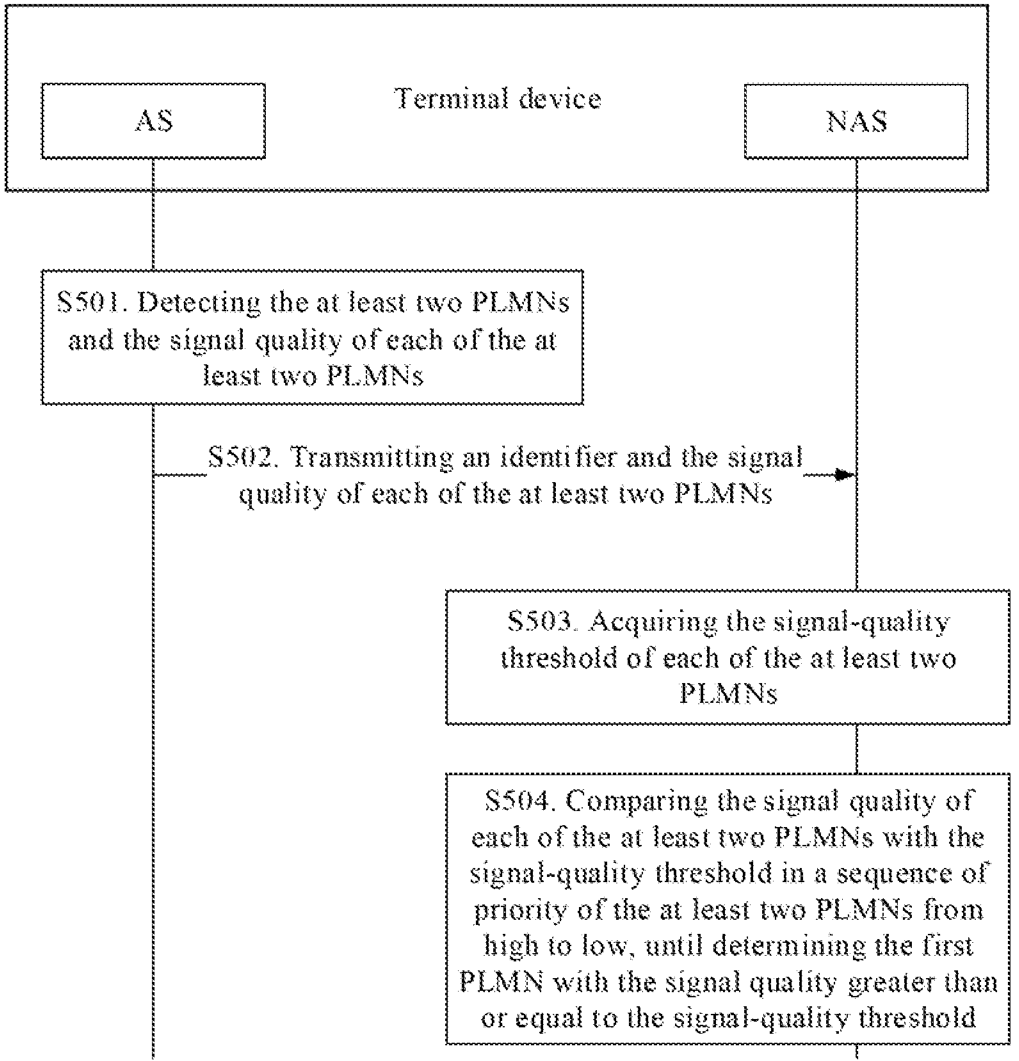
FIG. 5 is a schematic flowchart of a third embodiment of a network selection method according to some embodiments of the present disclosure.

In one possible design of embodiments of the present disclosure, FIG. 5 is a schematic flowchart of a third embodiment of a network selection method according to some embodiments of the present disclosure. As shown in FIG. 5, in embodiments of the present disclosure, the network selection method may include following operations.

At operation S501, the AS of the terminal device detects the at least two PLMNs and the signal quality of each of the at least two PLMNs.

At operation S502, the AS of the terminal device transmits an identifier and the signal quality of each of the at least two PLMNs to the NAS of the terminal device.

At operation S503, the NAS of the terminal device acquires the signal-quality threshold of each of the at least two PLMNs.

At operation S504, the NAS of the terminal device compares the signal quality of each of the at least two PLMNs with the signal-quality threshold in a sequence of priority of the at least two PLMNs from high to low, until the first PLMN with the signal quality greater than or equal to the signal-quality threshold is determined.

In embodiments of the present disclosure, the AS of the terminal device is configured to search the identifier and signal quality of at least two PLMNs in a scene where the the terminal device is located and transmit them to the NAS. The NAS acquires the signal-quality threshold and priority of each of the at least two PLMNs, and determines the PLMN with the highest priority and signal quality greater than or equal to the signal-quality threshold as the first PLMN in the sequence of priority of each of the at least two PLMNs from high to low. In this solution, the NAS may select PLMN whose signal quality meets the requirements and has high priority, which ensures the stability of the terminal device after the terminal device is accessed to the network.

Figure 6:
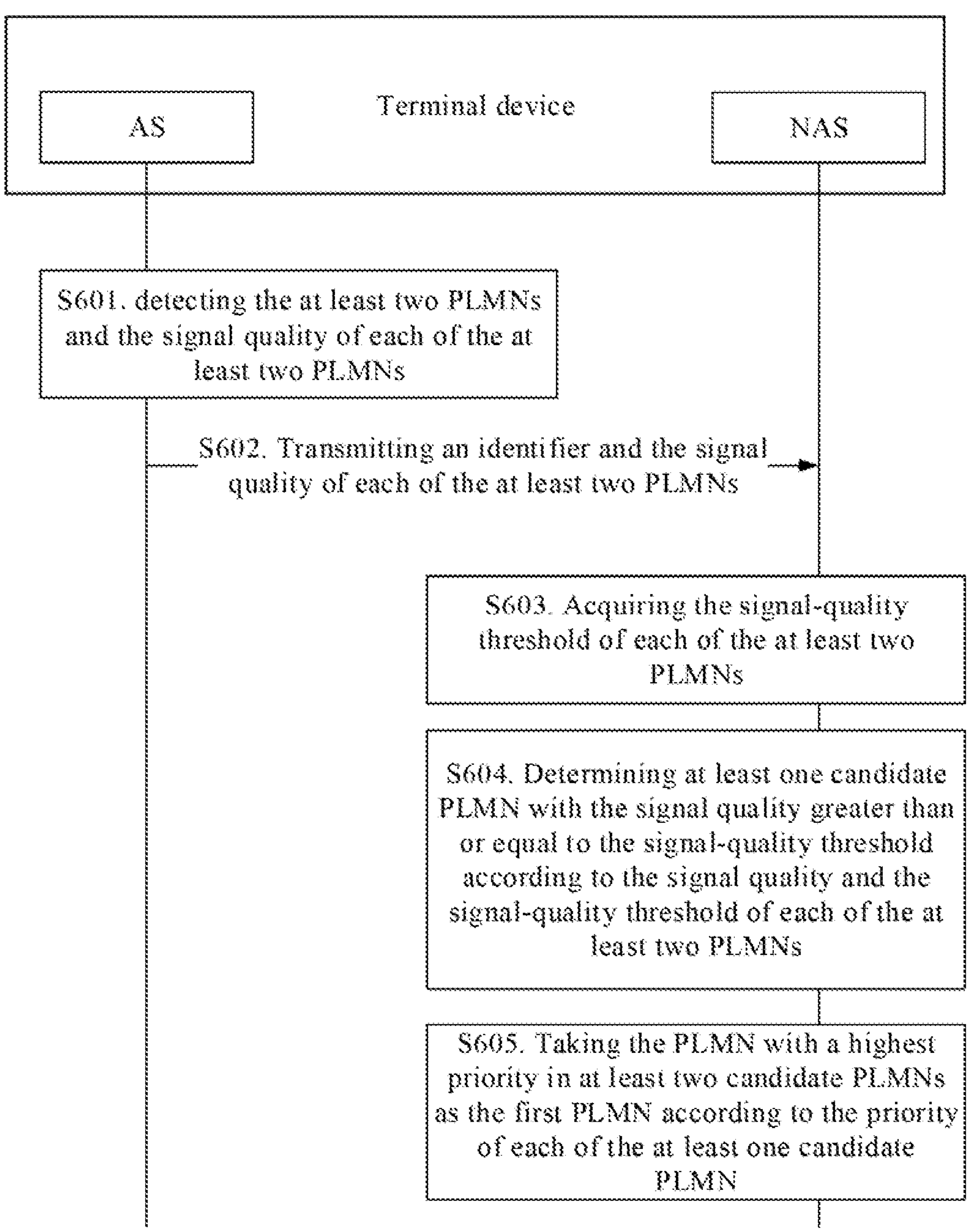
FIG. 6 is a schematic flowchart of a fourth embodiment of a network selection method according to some embodiments of the present disclosure.

In another possible design of embodiments of the present disclosure, FIG. 6 is a schematic flowchart of a fourth embodiment of a network selection method according to some embodiments of the present disclosure. As shown in FIG. 6, in embodiments of the present disclosure, the network selection method may include following operations.

At operation S601, the AS of the terminal device detects the at least two PLMNs and the signal quality of each of the at least two PLMNs.

At operation S602, the AS of the terminal device transmits an identifier and the signal quality of each of the at least two PLMNs to the NAS of the terminal device.

At operation S603, the NAS of the terminal device acquires the signal-quality threshold of each of the at least two PLMNs.

At operation S604, the NAS of the terminal device determines at least one candidate PLMN with the signal quality greater than or equal to the signal-quality threshold according to the signal quality and the signal-quality threshold of each of the at least two PLMNs.

At operation S605, the NAS takes the PLMN with a highest priority in at least two candidate PLMNs as the first PLMN according to the priority of each of the at least one candidate PLMN.

A difference between embodiments shown in FIG. 6 and the embodiment shown in FIG. 5 is that the NAS selects the first PLMN in another way.

Specifically, in embodiments of shown in FIG. 6, after the NAS of the terminal device acquires the identifier and signal quality of each of the at least two PLMNs from the AS, the NAS determines at least one candidate PLMN with the signal quality greater than or equal to the signal-quality threshold in combination with the signal-quality threshold of each PLMN acquired by itself. Then, in combination with the priority of these candidate PLMNs, the NAS selects the PLMN with the highest priority as the finally selected first PLMN, that is, the NAS, according to the signal quality and signal-quality threshold of each PLMN, takes the PLMN with the signal quality greater than or equal to the signal-quality threshold and a highest priority in the at least two PLMNs as the first PLMN.

In the technical solution of the present disclosure, the NAS of the terminal device may also select a PLMN with high priority and signal quality that meet the requirements, which may also ensure the stability of the terminal device after being accessed to the network.

Figure 7:
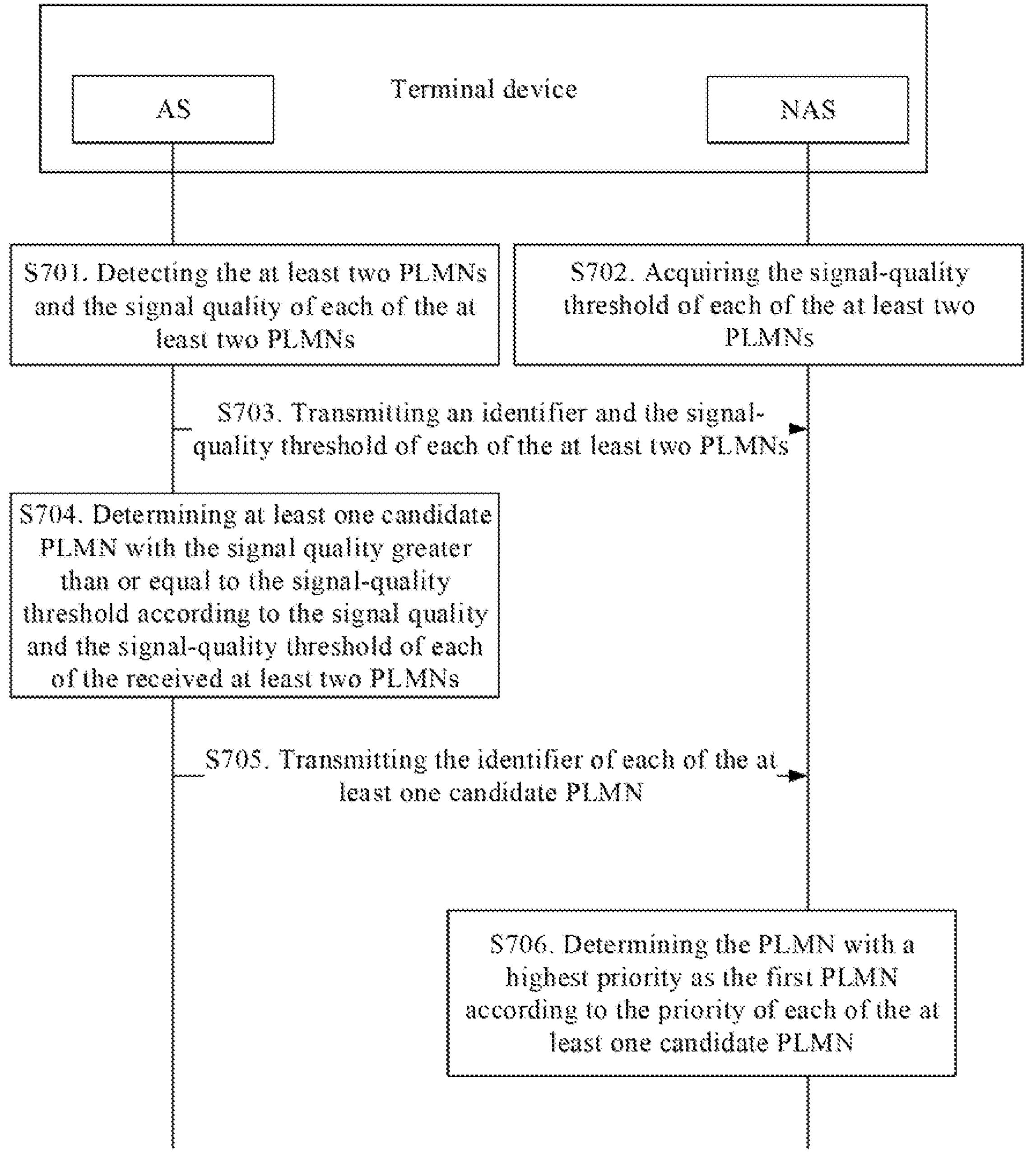
FIG. 7 is a schematic flowchart of a fifth embodiment of a network selection method according to some embodiments of the present disclosure.

In still another possible design of embodiments of the present disclosure, FIG. 7 is a schematic flowchart of a fifth embodiment of a network selection method according to some embodiments of the present disclosure. As shown in FIG. 7, in embodiments of the present disclosure, the network selection method may include following operations.

At operation S701, the AS of the terminal device detects the at least two PLMNs and the signal quality of each of the at least two PLMNs.

At operation S702, the NAS of the terminal device acquires the signal-quality threshold of each of the at least two PLMNs.

At operation S703, the NAS of the terminal device transmits an identifier and the signal-quality threshold of each of the at least two PLMNs to the AS.

At operation S704, the AS of the terminal device determines at least one candidate PLMN with the signal quality greater than or equal to the signal-quality threshold according to the signal quality and the signal-quality threshold of each of the received at least two PLMNs.

At operation S705, the AS of the terminal device transmits the identifier of each of the at least one candidate PLMN to the NAS.

At operation S706, the NAS of the terminal device determines the PLMN with a highest priority as the first PLMN according to the priority of each of the at least one candidate PLMN.

In embodiments of the present disclosure, the NAS of the terminal device transmits the acquired signal-quality threshold of each PLMN to the AS, and the AS determines at least one candidate PLMN with the signal quality greater than or equal to the signal-quality threshold in at least two detected PLMNs according to the signal-quality threshold of each PLMN, then the NAS determines the PLMN with the highest priority in the at least one candidate PLMN as the first PLMN according to the priority of at least one candidate PLMN. In this solution, the NAS may also select PLMN with the signal quality meeting the requirements and high priority, which ensures the stability of the terminal device after it is accessed to the network.

It may be understood that, in the solution of the NAS acquiring the signal-quality threshold of each PLMN in FIGS. 5 to 7, one design solution may include the NAS acquiring the signal-quality threshold by reading the profile in the USIM card. Another design solution may include the NAS acquiring the signal-quality threshold of each PLMN transmitted by the network device through the NAS signaling. Another still design solution may include the NAS reading the pre-stored signal-quality threshold of each PLMN from the internal storage space of the terminal device. Embodiments of the present disclosure does not define the way which the NAS acquires a signal-quality threshold of each PLMN, which may be determined according to the actual scene, and is not repeated here.

Figures 8, 9, 10:
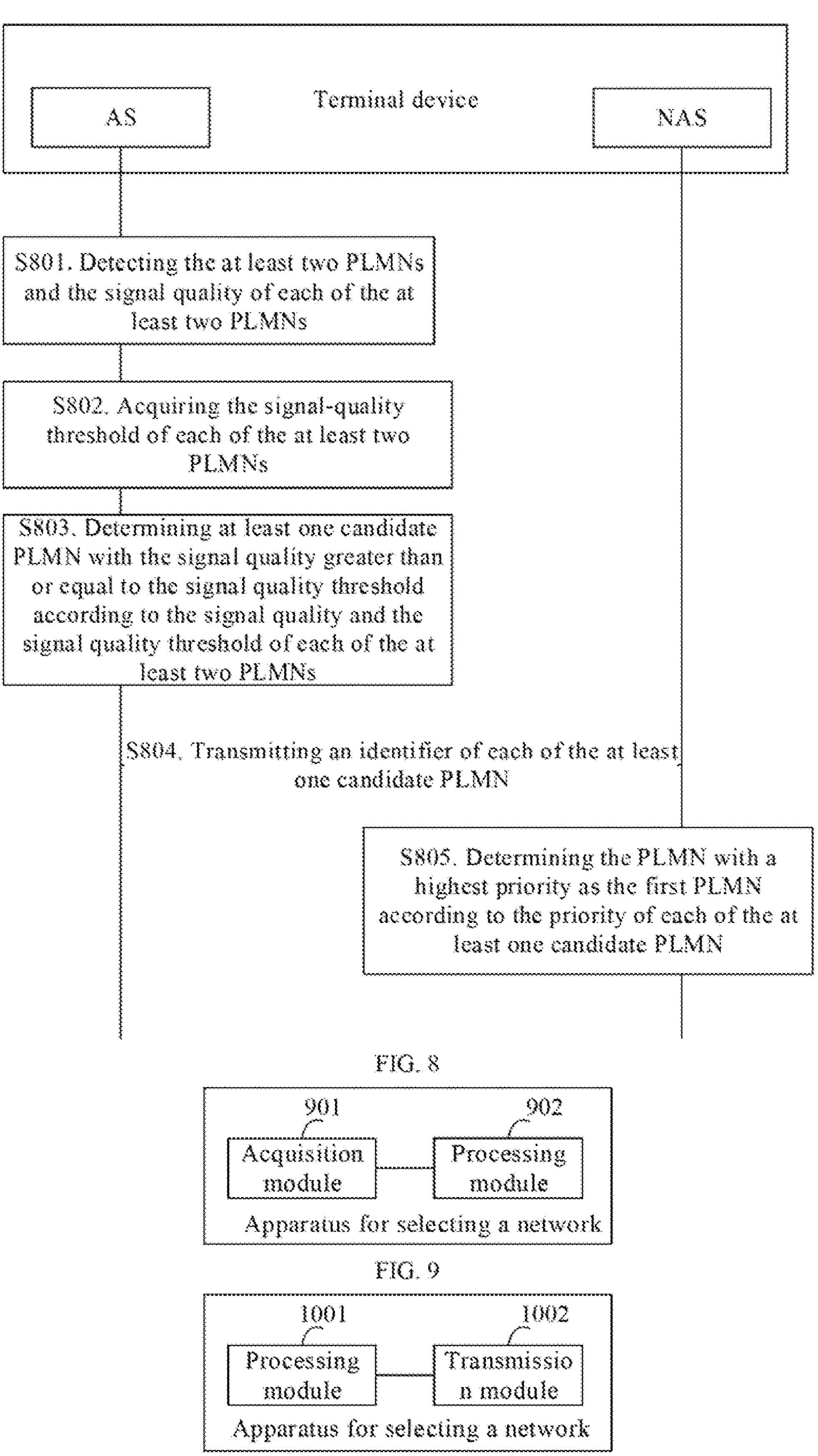
FIG. 8 is a schematic flowchart of a sixth embodiment of a network selection method according to some embodiments of the present disclosure.
FIG. 9 is a structural schematic diagram of a first embodiment of an apparatus for selecting a network according to some embodiments of the present disclosure.
FIG. 10 is a structural schematic diagram of a second embodiment of an apparatus for selecting a network according to some embodiments of the present disclosure.

In still another possible design of embodiments of the present disclosure, FIG. 8 is a schematic flowchart of a sixth embodiment of a network selection method according to some embodiments of the present disclosure. As shown in FIG. 8, in embodiments of the present disclosure, the network selection method may include following operations.

At operation S801. the AS of the terminal device detects the at least two PLMNs and the signal quality of each of the at least two PLMNs.

At operation S802, the AS of the terminal device acquires the signal-quality threshold of each of the at least two PLMNs.

Specifically, the AS usually acquires the signal-quality threshold of each of the at least two PLMNs configured by the base station by reading system information.

At operation S803, the AS of the terminal device determines at least one candidate PLMN with the signal quality greater than or equal to the signal-quality threshold according to the signal quality and the signal-quality threshold of each of the at least two PLMNs.

At operation S804, the AS of the terminal device transmits an identifier of each of the at least one candidate PLMN to the NAS.

At operation S805, the NAS of the terminal device determines the PLMN with a highest priority as the first PLMN according to the priority of each of the at least one candidate PLMN.

It may be understood that when the number of the candidate PLMNs is one, the NAS of the terminal device may directly determine the candidate PLMN as the first PLMN without judging according to the priority.

In embodiments of the present disclosure, the AS of the terminal device may not only acquire the signal-quality threshold of each PLMN, but also acquire the at least two detected PLMNs and the signal quality of each of the at least two PLMNs. In this way, the AS may determine the at least one candidate PLMN with the signal quality greater than or equal to the signal-quality threshold from the at least two detected PLMNs according to the signal-quality threshold of each of the at least two PLMNs, and then transmit the at least one candidate PLMN to the NAS, and then the NAS determines the first PLMN with the highest priority in the at least one candidate PLMN according to the priority of the at least one candidate PLMN. In this solution, the NAS may also select PLMN with the signal quality meeting the requirements and high priority, which ensures the stability of the terminal device after the terminal is accessed to the network.

The above describes specific implementation of the network selection method mentioned in embodiments of the present disclosure. The following is apparatus embodiments of the present disclosure, which may be configured to perform the method embodiments of the present disclosure. Details not disclosed in the apparatus embodiments of the present disclosure may refer to the method embodiments of the present disclosure.

FIG. 9 is a structural schematic diagram of a first embodiment of an apparatus for selecting a network according to some embodiments of the present disclosure. The apparatus may be integrated in the terminal device or implemented through the terminal device. As shown in FIG. 9, the apparatus for selecting a network may include following.

An acquisition module 901 is configured to acquire first parameters of each of at least two PLMNs. The first parameters include signal quality and priority.

A processing module 902 is configured to select a first PLMN from the at least two PLMNs according to the first parameters of each of the at least two PLMNs.

In a possible design of embodiments of the present disclosure, the first parameters also include a signal-quality threshold.

Accordingly, the processing module 902 is specifically configured to determine the first PLMN from the at least two PLMNs according to the signal quality, athe signal-quality threshold and the priority of each of the at least two PLMNs.

In some embodiments, the signal-quality threshold is derived from the profile in the global subscriber identity card.

For example, the processing module 902 is specifically configured to: compare the signal quality of each of the at least two PLMNs with the signal-quality threshold in a sequence of the priority of the at least two PLMNs from high to low through the NAS of the apparatus, until the first PLMN with the signal quality greater than or equal to the signal-quality threshold is determined.

For another example, the processing module 902 is specifically configured to according to the signal quality and signal-quality threshold of each of the at least two PLMNs, take the PLMN with the signal quality greater than or equal to the signal-quality threshold and the highest priority in the at least two PLMNs as the first PLMN through the NAS of the apparatus.

For still another example, the processing module 902 is also configured to transmit the identifier and the signal-quality threshold of each of the at least two PLMNs to the AS of the apparatus through the NAS of the apparatus.

In another possible design of embodiments of the present disclosure, the acquisition module 901 is also configured to enable the NAS of the apparatus to acquire the signal-quality threshold of each of the at least two PLMNs through the NAS signaling.

In still another possible design of embodiments of the present disclosure, the signal-quality threshold is derived from the system information of the network device.

In some embodiments, the processing module 902 is specifically configured to:

determine at least one candidate PLMN with the signal quality greater than or equal to the signal-quality threshold according to the signal quality and the signal-quality threshold of each of the at least two PLMNs through the AS of the apparatus;

transmit the identifier of each of the at least one candidate PLMN to the NAS of the apparatus through the AS of the apparatus; and determine a PLMN with the highest priority as the first PLMN according to the priority of each of the at least one candidate PLMN through the NAS of the apparatus.

In the above various possible designs of embodiments of the present disclosure, the signal-quality threshold includes at least one of following.

A signal-quality threshold corresponding to a PLMN, and a signal-quality threshold corresponding to the RAT applied in a PLMN.

In still another possible design of embodiments of the present disclosure, the processing module 902 is specifically configured to:

sort the at least two PLMNs in a sequence of signal quality from high to low according to the signal quality of each of the at least two PLMNs, screen out the anterior N PLMNs in the sequence, and the N is an integer greater than or equal to 1;

determine the PLMN with the highest priority in the N PLMNs as the first PLMN.

The apparatus for selecting a network provided in some embodiments is configured to implement the technical solution on the terminal device side in the aforementioned method embodiments. Implementation principles and technical effect are similar, which are not repeated here.

FIG. 10 is a structural schematic diagram of a second embodiment of an apparatus for selecting a network according to some embodiments of the present disclosure The apparatus may be integrated in or implemented through a network device. As shown in FIG. 10, the apparatus for selecting a network may include following.

A processing module 1001 is configured to configure or update the signal-quality threshold of each of the at least two PLMNs for the terminal device.

A transmission module 1002 is configured to transmit the signal-quality threshold of each of the at least two PLMNs to the terminal device.

In one possible design of embodiments of the present disclosure, the transmission module 1002 is specifically configured to transmit the signal-quality threshold of each of the at least two PLMNs to the terminal device through the NAS signaling.

In another possible design of embodiments of the present disclosure, the processing module 1001 is specifically configured to add the signal-quality threshold of each of the at least two PLMNs in the system information of the base station.

Correspondingly, the transmission module 1002 is specifically configured to broadcast the signal-quality threshold of each of the at least two PLMNs to the terminal device through the system information.

The apparatus for selecting a network provided in this embodiment is configured to implement the technical solution on the network device side in the aforementioned method embodiments. Implementation principle and technical effect are similar, which are not repeated here.

Figure 11:
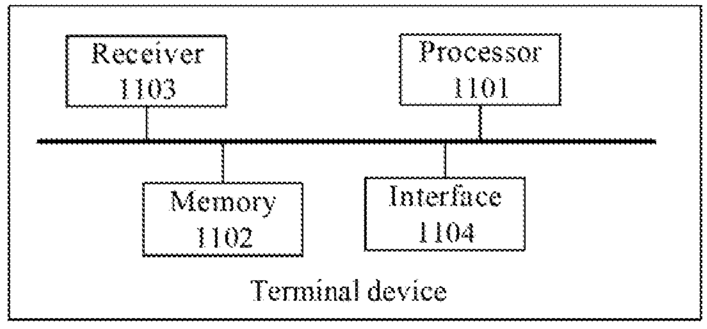
FIG. 11 is a structural schematic diagram of a terminal device according to some embodiments of the present disclosure.

FIG. 11 is a structural schematic diagram of a terminal device according to some embodiments of the present disclosure. As shown in FIG. 11, the terminal device may include a processor 1101, a memory 1102, a receiver 1103, and an interface 1104 for communication with a network device.

The memory 1102 is configured to store computer execution instructions.

The processor 1101 is configured to execute the computer execution instructions stored in the memory 1102, causing the processor 1101 to perform the technical solution on the terminal device side as in the aforementioned method embodiments.

Figure 12:
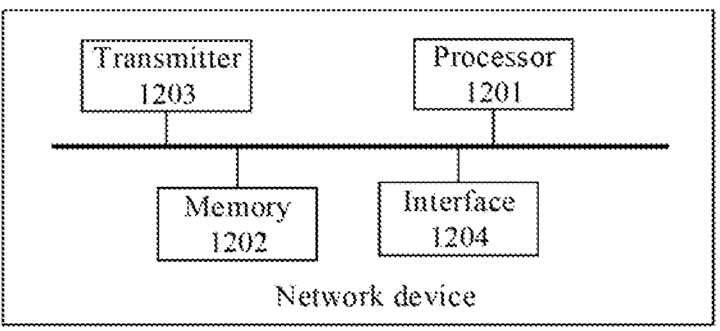
FIG. 12 is a structural schematic diagram of a network device according to some embodiments of the present disclosure.

FIG. 12 is a structural schematic diagram of a network device according to some embodiments of the present disclosure. As shown in FIG. 12, the network device may include a processor 1201, a memory 1202, a transmitter 1203, and an interface 1204 for communicating with a terminal device.

The memory 1202 is configured to store computer execution instructions.

The processor 1201 is configured to execute the computer execution instructions stored in the memory 1202, causing the processor 1201 to perform the technical solution of the network device side in the aforementioned method embodiments.

Further, embodiments of the present disclosure may also provide a communication system, which may include a terminal device and a network device.

The terminal device may include the apparatus for selecting a network described in FIG. 9 or the terminal device described in FIG. 11. The terminal device is configured to implement the technical solution of the terminal device in the above method embodiments. The network device may include the apparatus for selecting a network described in FIG. 10 or the network device described in FIG. 12. The network device is configured to implement the technical solution of the network device in the above method embodiments.

It may be understood that the communication system may also include other devices, which may be determined according to actual scenes, and is not repeated here.

The present disclosure also provides a computer-readable storage medium, in which computer execution instructions are stored. When the computer execution instructions are executed by a processor, it is configured to implement the technical solution of the terminal device side in the aforementioned method embodiments.

The present disclosure also provides a computer-readable storage medium, in which computer execution instructions are stored. When the computer execution instructions are executed by a processor, it is configured to implement the technical solution of the network device side in the above method embodiments.

Embodiments of the present disclosure also provides a program for executing the technical solution of the terminal device side in the aforementioned method embodiments when the program is executed by the processor.

Embodiments of the present disclosure also provides a program for executing the technical solution of the network device side in the aforementioned method embodiments when the program is executed by the processor.

Embodiments of the present disclosure also provides a computer program product including a computer program configured to implement the technical solution of the terminal device side in the aforementioned method embodiments when the computer program is executed by a processor.

Embodiments of the present disclosure also provides a computer program product including a computer program configured to implement the technical solution of the network device side in the aforementioned method embodiments when the computer program is executed by a processor.

Embodiments of the present disclosure also provides a chip including a processing module and a communication interface. The processing module may perform the technical solution of the terminal device side in the aforementioned method embodiments.

Further, the chip may also include a memory module (such as a memory) configured to store instructions, and the processing module is configured to execute the instructions stored in the memory module. The processing module performs the technical solution of the terminal device side in the above method embodiments in response to the instructions stored in the memory module executing.

Embodiments of the present disclosure also provides a chip including a processing module and a communication interface. The processing module may perform the technical solution of the network device side in the aforementioned method embodiments.

Further, the chip may also include a memory module (such as a memory) configured to store instructions. The processing module performs the technical solution of the network device side in the above method embodiments in response to the instructions stored in the memory module executing.

In several embodiments provided herein, it should be understood that the disclosed apparatus may be implemented in other ways. For example, the device embodiments described above are merely illustrative. For example, the division of the above units is only a logical function division. In actual implementation, there may be another division manner. For example, multiple units or components may be combined or integrated into another system, or some features can be ignored or not executed. In addition, the mutual coupling or direct coupling or communication connection shown or discussed may be an indirect coupling or communication connection through some interfaces, devices or units, and may be electrical or in other forms.

In the specific embodiments of the above network device and terminal device, it should be understood that the processor may be a central processing unit (CPU), other general processors, digital signal processors (DSP), or an application specific integrated circuit (ASIC), etc. The general processor may be a microprocessor or t any conventional processor, etc. The operations of the method disclosed in the present disclosure may be directly performed by a hardware processor, or performed by a combination of a hardware and a software module in the processor.

All or some of the operations to implement the above method embodiments may be completed by a hardware related to program instructions. The program may be stored in a readable memory. When the program is executed, the operations including the embodiments of the above methods are performed. The aforementioned memory (storage medium) includes a read-only memory (ROM), a random access memory RAM, a flash memory, a hard disk, a solid state disk, a magnetic tape, a floppy disk, an optical disk, or any combination thereof

What is claimed is:

1. A network selection method, comprising:

acquiring, by a terminal device, first parameters of each of at least two public land mobile networks (PLMNs), the first parameters comprising signal quality and priority;

selecting, by the terminal device, a first PLMN from the at least two PLMNs according to the first parameters of each of the at least two PLMNs; and accessing, by the terminal device, the first PLMN;

wherein the first parameters further comprise a signal-quality threshold; and the selecting, by the terminal device, a first PLMN from the at least two PLMNs according to the first parameters of each of the at least two PLMNs comprises:

determining, by the terminal device the first PLMN from the at least two PLMNs according to the signal quality, the signal-quality threshold and the priority of each of the at least two PLMNs;

wherein the signal-quality threshold comprises at least one of: a signal-quality threshold corresponding a PLMN, or a signal-quality threshold corresponding to a radio access technology applied in a PLMN.

2. The method as claimed in claim 1, wherein the signal-quality threshold is derived from a profile in a global subscriber identity card.

3. The method as claimed in claim 2, further comprising:

acquiring, by a non-access stratum (NAS) of the terminal device, the signal-quality threshold of each of the at least two PLMNs through NAS signaling.

4. The method as claimed in claim 1, wherein the determining, by the terminal device, the first PLMN from the at least two PLMNs according to the signal quality, the signal-quality threshold and the priority of each of the at least two PLMNs, comprises:

comparing, by a non-access stratum (NAS) of the terminal device, the signal quality of each of the at least two PLMNs with the signal-quality threshold thereof in a sequence of priority of the at least two PLMNs from high to low, until determining the first PLMN with the signal quality greater than or equal to the signal-quality threshold.

5. The method as claimed in claim 1, further comprising:

transmitting, by a non-access stratum (NAS) of the terminal device, an identifier and the signal-quality threshold of each of the at least two PLMNs to an access stratum (AS) of the terminal device.

6. The method as claimed in claim 5, wherein the determining, by the terminal device, the first PLMN from the at least two PLMNs according to the signal quality, the signal-quality threshold and the priority of each of the at least two PLMNs, comprises:

determining, by the AS of the terminal device, at least one candidate PLMN with the signal quality greater than or equal to the signal-quality threshold according to the signal quality and the signal-quality threshold of each of the at least two PLMNs;

transmitting, by the AS of the terminal device, an identifier of each of the at least one candidate PLMN to the NAS of the terminal device; and determining, by the NAS of the terminal device, a PLMN with a highest priority as the first PLMN according to the priority of each of the at least one candidate PLMN.

7. The method as claimed in claim 1, wherein the selecting, by the terminal device, a first PLMN from the at least two PLMNs according to the first parameters of each of the at least two PLMNs, comprises:

sorting the at least two PLMNs in a sequence of the signal quality from high to low according to the signal quality of each of the at least two PLMNs, screening out anterior N PLMNs in the sequence, the N being an integer greater than or equal to 1; and determining a PLMN with a highest priority in the N PLMNs as the first PLMN.

8. A terminal device, comprising:

a processor;

a memory, configured to store computer execution instructions;

a receiver; and an interface, configured to communicate with a network device;

wherein the processor executes the computer execution instructions stored in the memory to perform a method comprising:

acquiring, by a terminal device, first parameters of each of at least two public land mobile networks (PLMNs), the first parameters comprising signal quality and priority;

selecting, by the terminal device, a first PLMN from the at least two PLMNs according to the first parameters of each of the at least two PLMNs; and accessing, by the terminal device, the first PLMN;

wherein the first parameters further comprise a signal-quality threshold; and the selecting, by the terminal device a first PLMN from the at least two PLMNs according to the first parameters of each of the at least two PLMNs, comprises:

determining, by the terminal device, the first PLMN from the at least two PLMNs according to the signal quality, the signal-quality threshold and the priority of each of the at least two PLMNs;

wherein the signal-quality threshold comprises at least one of: a signal-quality threshold corresponding a PLMN, or a signal-quality threshold corresponding to a radio access technology applied in a PLMN.

9. The terminal device as claimed in claim 8, wherein the signal- quality threshold is derived from a profile in a global subscriber identity card.

10. The terminal device as claimed in claim 9, wherein the method further comprises:

acquiring, by a non-access stratum (NAS) of the terminal device, the signal-quality threshold of each of the at least two PLMNs through NAS signaling.

11. The terminal device as claimed in claim 8, wherein the determining, by the terminal device, the first PLMN from the at least two PLMNs according to the signal quality, the signal-quality threshold and the priority of each of the at least two PLMNs, comprises:

comparing, by a non-access stratum (NAS) of the terminal device, the signal quality of each of the at least two PLMNs with the signal-quality threshold thereof in a sequence of priority of the at least two PLMNs from high to low, until determining the first PLMN with the signal quality greater than or equal to the signal-quality threshold.

12. The terminal device as claimed in claim 8, wherein the method further comprises:

transmitting, by a non-access stratum (NAS) of the terminal device, an identifier and the signal-quality threshold of each of the at least two PLMNs to an access stratum (AS) of the terminal device.

13. The terminal device as claimed in claim 12, wherein the determining, by the terminal device, the first PLMN from the at least two PLMNs according to the signal quality, the signal-quality threshold and the priority of each of the at least two PLMNs, comprises:

determining, by the AS of the terminal device, at least one candidate PLMN with the signal quality greater than or equal to the signal-quality threshold according to the signal quality and the signal-quality threshold of each of the at least two PLMNs;

transmitting, by the AS of the terminal device, an identifier of each of the at least one candidate PLMN to the NAS of the terminal device; and determining, by the NAS of the terminal device, a PLMN with a highest priority as the first PLMN according to the priority of each of the at least one candidate PLMN.

* * * * *